(12) United States Patent
Ono et al.

(10) Patent No.: US 11,637,326 B2
(45) Date of Patent: Apr. 25, 2023

(54) LAMINATE

(71) Applicant: TOYOTA JIDOSHA KABUSHIKI KAISHA, Toyota (JP)

(72) Inventors: Masato Ono, Shizuoka-ken (JP); Norihiro Ose, Shizuoka-ken (JP); Kazuhito Kato, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 16/703,166

(22) Filed: Dec. 4, 2019

(65) Prior Publication Data
US 2020/0212496 A1 Jul. 2, 2020

(30) Foreign Application Priority Data

Dec. 26, 2018 (JP) .............................. JP2018-242666

(51) Int. Cl.
*B32B 7/14* (2006.01)
*H01M 10/02* (2006.01)
(Continued)

(52) U.S. Cl.
CPC ........... *H01M 10/0585* (2013.01); *B32B 7/14* (2013.01); *H01M 10/02* (2013.01); *H01M 10/04* (2013.01); *H01M 10/05* (2013.01); *H01M 10/0525* (2013.01); *H01M 10/0562* (2013.01); *B32B 2264/105* (2013.01); *B32B 2264/108* (2013.01); *B32B 2307/202* (2013.01);
(Continued)

(58) Field of Classification Search
CPC ................. H01M 4/04; H01M 4/0402; H01M 4/043–0435; H01M 10/04; H01M 10/05–0525; H01M 10/056–0562; H01M 10/058–0587; B32B 7/12–14
See application file for complete search history.

(56) References Cited

U.S. PATENT DOCUMENTS

| 6,946,218 B2 * | 9/2005 | Crouch, Jr. ......... H01M 50/463 429/185 |
| 2005/0214647 A1 * | 9/2005 | Tanaka ................ H01M 4/0471 429/233 |

(Continued)

FOREIGN PATENT DOCUMENTS

| JP | H10-241725 A | 9/1998 |
| JP | 2013-206745 A | 10/2013 |

(Continued)

*Primary Examiner* — Jonathan Crepeau
*Assistant Examiner* — Jacob Buchanan
(74) *Attorney, Agent, or Firm* — Dickinson Wright, PLLC

(57) ABSTRACT

Provided is a laminate that is configured to suppress a deterioration in the all-solid-state battery even if the end part of the anode layer is cracked. The laminate may be a laminate comprising an anode layer, a solid electrolyte layer and a cathode layer in this order, wherein an area in a planar direction of the cathode layer is smaller than an area in a planar direction of the anode layer; wherein an end part of the cathode layer comprises, on the solid electrolyte layer, a thin film part having a smaller thickness than a thickness of a central part of the cathode layer; and wherein the end part of the cathode layer comprises, on the thin film part, a space part formed by a level difference between the thin film part and the central part.

4 Claims, 2 Drawing Sheets

(51) Int. Cl.
  *H01M 10/0562*    (2010.01)
  *H01M 10/05*     (2010.01)
  *H01M 10/0585*    (2010.01)
  *H01M 10/0525*    (2010.01)
  *H01M 10/04*     (2006.01)

(52) U.S. Cl.
  CPC . *B32B 2457/10* (2013.01); *H01M 2300/0065* (2013.01); *Y02E 60/10* (2013.01)

(56) References Cited

U.S. PATENT DOCUMENTS

| | | | |
|---|---|---|---|
| 2010/0099029 A1* | 4/2010 | Kinoshita | H01M 4/62 |
| | | | 429/316 |
| 2013/0330596 A1* | 12/2013 | Mano | H01M 50/148 |
| | | | 429/163 |
| 2015/0004462 A1* | 1/2015 | Huang | H01M 50/24 |
| | | | 429/127 |
| 2017/0162901 A1* | 6/2017 | Chen | H01M 10/0525 |
| 2017/0263981 A1* | 9/2017 | Satou | H01M 4/663 |
| 2020/0076002 A1 | 3/2020 | Okamoto et al. | |

FOREIGN PATENT DOCUMENTS

| | | |
|---|---|---|
| JP | 2016-001600 A | 1/2016 |
| JP | 2017-084609 A | 5/2017 |
| JP | 2018-006289 A | 1/2018 |
| WO | 2018/110688 A1 | 6/2018 |

\* cited by examiner

LAMINATE

TECHNICAL FIELD

The disclosure relates to a laminate.

BACKGROUND

In recent years, with the rapid spread of IT and communication devices such as personal computers, camcorders and cellular phones, great importance has been attached to the development of batteries that is usable as the power source of such devices. In the automobile industry, etc., high-power and high-capacity batteries for electric vehicles and hybrid vehicles are under development.

Of all-solid-state batteries, an all-solid-state lithium ion battery has attracted attention, due to its high energy density resulting from the use of a battery reaction accompanied by lithium ion transfer, and due to the use of a solid electrolyte as the electrolyte present between the cathode and the anode, in place of a liquid electrolyte containing an organic solvent.

Patent Literature 1 describes that the surface area of a surface, on which a force is applied, is increased and the force is distributed, by increasing the thickness of the central part of a solid battery as compared with the thickness of the end part thereof, and the occurrence of damage of the solid battery due to an impact, can be suppressed.

Patent Literature 2 describes that a surface of at least one of a cathode active material layer, a solid electrolyte layer and an anode active material layer is pressed to form crests.

Patent Literature 3 describes that a thin layer part which is thinner than a central part, is formed at both ends of active material layers retaining an anode plate, and the thin layer part faces separators disposed at some distance from the thin layer part.

Patent Literature 4 describes that the end regions of an anode active material layer are higher than the center region thereof, in the content of a second anode active material (an active material other than carbon).

Patent Literature 5 describes a cylindrical battery in which the cathode has a recess formed in the thickness direction thereof, at an end of an active material filling region on the side of the end face where a collector is welded; the anode has a protrusion formed in the thickness direction thereof, at the end of the active material filling region and at a position facing the recess of the cathode; and the protrusion of the anode enters the recess of the cathode.

Patent Literature 1: Japanese Patent Application Laid-Open (JP-A) No. 2016-001690
Patent Literature 2: JP-A No. 2017-084609
Patent Literature 3: JP-A No. 1998-241725
Patent Literature 4: JP-A No. 2018-006289
Patent Literature 5: JP-A No. 2013-206745

An all-solid-state battery in which the area in the planar direction of the cathode layer is smaller than the area in the planar direction of the anode layer, has the following problem: in the production of the all-solid-state battery, a crack may be formed by high-pressure pressing of a laminate of the cathode layer, the solid electrolyte layer and the anode layer, the crack starting from the end edge in the planar direction of the cathode layer to the end part of the solid electrolyte layer and the end part of the anode layer, and during the use of the all-solid-state battery, current is concentrated at the cracked part of the end part of the anode layer and causes the all-solid-state battery to deteriorate.

SUMMARY

In light of the above circumstances, an object of the disclosed embodiments is to provide a laminate that is configured to suppress a deterioration in the all-solid-state battery even if the end part of the anode layer is cracked.

In a first embodiment, there is provided a laminate comprising an anode layer, a solid electrolyte layer and a cathode layer in this order,
wherein an area in a planar direction of the cathode layer is smaller than an area in a planar direction of the anode layer;
wherein an end part of the cathode layer comprises, on the solid electrolyte layer, a thin film part having a smaller thickness than a thickness of a central part of the cathode layer; and
wherein the end part of the cathode layer comprises, on the thin film part, a space part formed by a level difference between the thin film part and the central part.

An electroconductive material may be contained in the space part of the cathode layer.

An adhesive may be contained in the space part of the cathode layer.

The adhesive may comprise an electroconductive substance which contains at least one kind of powder selected from the group consisting of carbon powder and aluminum powder.

According to the disclosed embodiments, the laminate configured to suppress a deterioration in the all-solid-state battery even if the end part of the anode layer is cracked, can be provided.

BRIEF DESCRIPTION OF THE DRAWINGS

In the accompanying drawings.

DETAILED DESCRIPTION

The laminate of the disclosed embodiments is a laminate comprising an anode layer, a solid electrolyte layer and a cathode layer in this order,
wherein an area in a planar direction of the cathode layer is smaller than an area in a planar direction of the anode layer;
wherein an end part of the cathode layer comprises, on the solid electrolyte layer, a thin film part having a smaller thickness than a thickness of a central part of the cathode layer; and
wherein the end part of the cathode layer comprises, on the thin film part, a space part formed by a level difference between the thin film part and the central part.

For an all-solid-state battery having a layered structure, the end part has a fragile structure.

To suppress the formation of dendrites of metal ions (e.g., lithium ions) serving as a charge carrier, an all-solid-state battery generally includes a part where the area in the planar direction of the cathode layer is smaller than the area in the planar direction of the anode layer (that is, the width of the cathode layer is smaller than the width of the anode layer) and the cathode layer is not present on the solid electrolyte layer. As a result, the all-solid-state battery has a multilevel structure.

Accordingly, when the laminate is pressed at high pressure in all-solid-state battery production, a crack starting from the end edge in the planar direction of the cathode layer to the end part of the solid electrolyte layer and the end part of the anode layer, may be formed.

Figure 4:
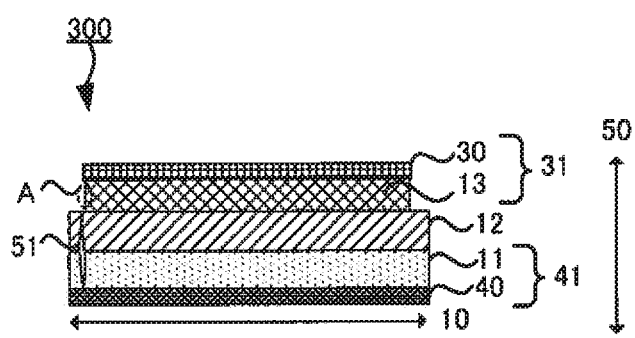
FIG. 4 is a schematic sectional view of an example of a conventional all-solid-state battery.

FIG. 4 is a schematic sectional view of an example of a conventional all-solid-state battery.

As shown in FIG. 4, a conventional all-solid-state battery 300 comprises a cathode 31 comprising a cathode current collector 30 and a cathode layer 13, an anode 41 comprising an anode current collector 40 and an anode layer 11, and a solid electrolyte layer 12 disposed between the cathode layer 13 and the anode layer 11.

In the conventional all-solid-state battery 300, the area in the planar direction 10 of the cathode layer 13 is smaller than the area in the planar direction 10 of the anode layer 11.

In the conventional all-solid-state battery 300, a crack 51 starting from the end edge A in the planar direction 10 of the cathode layer 13 (i.e., an area surrounded by a dashed line in FIG. 4) to the end part of the solid electrolyte layer 12 and the end part of the anode layer 11, is formed.

As a measure against the above, a part where, in the end part in the planar direction (the width direction) of the cathode layer, a level difference is formed between the cathode layer and the solid electrolyte layer, may be filled with a different kind of material (such as a filler). However, there is still a high possibility of a crack in the end part of the anode layer, compared to the central part of the anode layer.

Once a crack is formed in the anode layer, during the use of the all-solid-state battery, current is concentrated at the crack and causes a deterioration in battery performance.

The laminate of the disclosed embodiments uses the cathode layer that the content of the cathode active material and the thickness of the cathode layer are smaller in the end part than in the central part in the planar direction (the width direction). Accordingly, even if the end part of the anode layer is cracked, local current concentration is suppressed during the all-solid-state battery is in use.

For the laminate of the disclosed embodiments, by filling the space part of the end part of the cathode layer with at least one of the electroconductive material and the adhesive, uneven surface pressure distribution in the all-solid-state battery comprising the laminate, is suppressed.

For the laminate of the disclosed embodiments, by filling the space part of the end part of the cathode layer with the electroconductive material, the electroconductivity of the end part in the all-solid-state battery comprising the laminate is increased, whereby the resistance of the end part of the cathode layer, is decreased.

For the laminate of the disclosed embodiments, by filling the space part of the end part of the cathode layer with the adhesive, the adhesion between a cathode current collector and the thin film part of the end part of the cathode layer in the all-solid-state battery comprising the laminate, is increased, whereby an increase in the resistance of the all-solid-state battery, which is due to the removal of the cathode current collector from the cathode layer, is suppressed.

Since the adhesive contains the electroconductive substance, the adhesion between the cathode current collector and the thin film part of the end part of the cathode layer in the all-solid-state battery comprising the laminate, is increased, and the electroconductivity of the end part in the all-solid-state battery comprising the laminate, is increased, whereby the resistance of the end part of the cathode layer is decreased.

Figure 1:
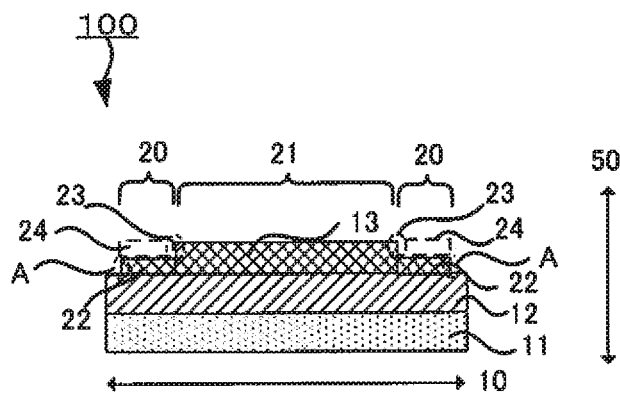
FIG. 1 is a schematic sectional view of an example of the laminate of the disclosed embodiments.

FIG. 1 is a schematic sectional view of an example of the laminate of the disclosed embodiments.

A laminate 100 of the disclosed embodiments comprises an anode layer 11, a solid electrolyte layer 12 and a cathode layer 13, which are disposed in this order.

For the laminate 100 of the disclosed embodiments, the area in the planar direction 10 of the cathode layer 13 is smaller than the area in the planar direction 10 of the anode layer 11.

An end part 20 of the cathode layer 13 comprises, on the solid electrolyte layer 12, a thin film part 22 having a smaller thickness than the thickness of a central part 21 of the cathode layer 13.

In addition, the end part 20 of the cathode layer 13 comprises, on the thin film part 22, a space part 24 formed by a level difference 23 between the thin film part 22 and the central part 21. In FIG. 1, the level difference 23 is indicated by a dotted line. As shown in FIG. 1, in a laminating direction 50 of the laminate 100, the thin film part 22 is formed by the level difference 23 between the thin film part 22 of the end part 20 of the cathode layer 13 and the central part 21 of the cathode layer 13. The space part 24 is a region starting from a surface of the thin film part 22, which is the opposite surface to the solid electrolyte layer 12-side surface of the thin film part 22, to a surface of the central part 21, which is the opposite surface to the solid electrolyte layer 12-side surface of the central part 21, and it is also a region starting from, in the planar direction 10 of the laminate 100, the level difference 23 to the end edge A of the thin film part 22, that is, a region indicated by a dashed line in FIG. 1. In FIG. 1, the end edge A is indicated by a long dashed double-short dashed line.

Cathode Layer

The cathode layer comprises the central part and the end part. The end part comprises the thin film part having a smaller thickness than the thickness of the central part. In addition, the end part comprises, on the thin film part, the space part.

The area in the planar direction of the cathode layer is smaller than the area in the planar direction of the anode layer.

The area in the planar direction of the cathode layer is not particularly limited, as long as it is smaller than the area in the planar direction of the anode layer, from the viewpoint of suppressing dendrite formation. From the viewpoint of increasing the energy density of the all-solid-state battery, the area in the planar direction of the cathode layer may be from 0.90 to 0.99, when the area in the planar direction of the anode layer is determined as 1.

The length in the planar direction of the cathode layer (i.e., the width of the cathode layer) may be smaller than the length in the planar direction of the anode layer, from the viewpoint of suppressing dendrite formation. It is not particularly limited. For example, it may be 0.1 μm or more and 1000 μm or less.

From the viewpoint of suppressing dendrite formation, the cathode layer may be disposed inside the anode layer, when the laminate is viewed in plan view from the laminating direction.

Central Part

The thickness of the central part of the cathode layer in the laminating direction of the laminate, is not particularly limited. For example, it may be 0.1 μm or more and 1000 μm or less.

End Part

The end part of the cathode layer comprises the thin film part having a smaller thickness than the thickness of the central part in the laminating direction of the cathode layer. In addition, the end part of the cathode layer comprises, on the thin film part, the space part.

In the disclosed embodiments, when the end edge of a layer is determined as distance 0 and the distance from the end edge of the layer to the center in the planar direction of the layer is determined as distance 1, the end part means a region between the end edge of the layer and distance 0.1.

Figure 2:
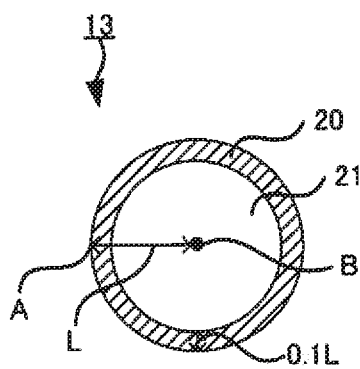
FIG. 2 is a schematic plan view of an example of the cathode layer for illustrating the end part of the disclosed embodiments.

FIG. 2 is a schematic plan view of an example of the cathode layer for illustrating the end part of the disclosed embodiments. FIG. 2 is a schematic view, and the illustration shown in FIG. 2 is not in actual size.

In FIG. 2, for the sake of simplicity, the cathode layer 13 is in a circular form. However, the form of the cathode layer is not limited to the circular form, and it may be a square form, a rectangle form, an elliptical form or the like.

In the cathode layer 13 shown in FIG. 2, when the distance from the end edge A of the cathode layer 13 to the center point B of the cathode layer 13 (that is, distance L) is determined as 1, the region between the end edge A of the cathode layer 13 and distance 0.1L, (i.e., the region indicated by diagonal lines in FIG. 2) is the end part 20 of the cathode layer 13, and the rest is the central part 21.

FIG. 2 shows an example of the cathode layer. In the disclosed embodiments, the end part of the anode layer and the end part of the solid electrolyte layer are similar in concept to the end part of the cathode layer.

Thin Film Part

The thin film part of the end part of the cathode layer is not particularly limited, as long as it is disposed on the solid electrolyte layer and has a smaller thickness than the thickness of the central part of the cathode layer.

When the thickness of the central part is determined as 1, the thickness of the thin film part of the end part of the cathode layer may be from 0.1 to 0.9 with respect to the thickness of the central part. From the viewpoint of ensuring the desired energy density of the all-solid-state battery, the thickness of the thin film part may be from 0.5 to 0.9, or it may be 0.5. When the thickness of the thin film part is in the range, the amount of current flowing through the end part of the cathode layer of the all-solid-state battery during the battery is in use, which corresponds to a decreased cathode active material amount in the end part of the cathode layer, decreases. Accordingly, even if the end part of the anode layer is cracked, local current concentration is suppressed.

Space Part

The space part of the end part of the cathode layer is a part occupying the space on the thin film part of the cathode layer. The thin film part is formed by the level difference between the thin film part of the end part of the cathode layer and the central part of the cathode layer. The space part of the end part of the cathode layer is a region starting from, in the laminating direction of the laminate, a surface of the thin film part, which is the opposite surface to the solid electrolyte layer-side surface of the thin film part, to a surface of the central part, which is the opposite surface of the solid electrolyte layer-side surface of the central part, and it is also a region starting from, in the planar direction of the laminate, the level difference to the end edge of the thin film part.

An electroconductive material may be contained in the space part. The amount of the electroconductive material contained in the space part is not particularly limited. From the viewpoint of ensuring electroconductivity, it may be an amount that ensures to absolutely fill the space part region, that is, an amount that is enough to erase the level difference between the thin film part of the end part of the cathode layer and the central part of the cathode layer and to flatten the cathode layer. As the electroconductive material, examples include, but are not limited to, those exemplified above as the electroconductive material of the cathode layer.

An adhesive may be contained in the space part. The amount of the adhesive contained in the space part is not particularly limited. From the viewpoint of suppressing a crack in the anode layer, it may be an amount that ensures to absolutely fill the space part region, that is, an amount that is enough to erase the level difference between the thin film part of the end part of the cathode layer and the central part of the cathode layer and to flatten the cathode layer.

The method for forming the thin film part and the space part is not particularly limited. For example, they may be produced by the following method: the cathode layer is shaved by applying laser to the cathode layer to form a desired space, thereby forming the thin film part and the space part. The laser application condition is not particularly limited, as long as it is a condition in which the desired thin film part and space part are obtained.

As the adhesive, examples include, but are not limited to, an adhesive which contains at least an adhesive resin and which may further contain, as needed, an electroconductive substance, etc.

From the viewpoint of attaching the battery materials with suppressing their deterioration, the adhesive may be a thermoplastic adhesive that contains a thermoplastic resin as the adhesive resin. From the point of view that it is easy to suppress the deterioration of the battery materials when attaching them, the adhesive may be a thermoplastic adhesive that contains a thermoplastic resin having a melting point that is lower than the deterioration temperatures of the battery materials.

The adhesive resin may be selected from conventionally-known adhesive resins and is not particularly limited.

As the thermoplastic resin used as the adhesive resin, examples include, but are not limited to, ethylene-vinyl acetate copolymer (EVA) and polyolefin-based resin such as low density polyethylene (LDPE). From the viewpoint of having excellent adhesive strength and an appropriate melting point, the adhesive resin may be ethylene-vinyl acetate copolymer (EVA).

From the viewpoint of easy handling, as the electroconductive substance that may be contained in the adhesive, examples include, but are not limited to, carbon powder and aluminum powder.

There is no particular limitation on the content of the electroconductive substance in the adhesive containing the electroconductive substance, From the viewpoint of excellent conduction between the cathode current collector and the cathode layer and suppressing an increase in battery resistance, the content of the electroconductive substance may be controlled to obtain a volume resistivity of $10 \times 10^3$ $\Omega$cm or less, or it may be controlled to obtain the same volume resistivity as the below-described carbon coat layer.

The adhesive may be a commercially-available product. For example, it may be selected from commercially-available adhesives and pressure-sensitive adhesives.

The cathode layer contains a cathode active material. As optional components, the cathode layer may contain a solid electrolyte, an electroconductive material, a binder, etc.

As the cathode active material, examples include, but are not limited to, a cathode active material represented by the following general formula: $Li_xM_yO_z$ (where M is a transition metal element; x is from 0.02 to 2.2; y is from 1 to 2; and z is from 1.4 to 4). The transition metal element M may be at least one selected from the group consisting of Co, Mn, Ni, V, Fe and Si, or it may be at least one selected from the group consisting of Co, Ni and Mn. As the cathode active material represented by the general formula $Li_xM_yO_z$, examples include, but are not limited to, $LiCoO_2$, $LiMnO_2$, $LiNiO_2$, $LiVO_2$, $LiNi_{1/3}Co_{1/3}Mn_{1/3}O_2$, $LiMn_2O_4$, $Li(Ni_{0.5}Mn_{1.5})O_4$, $Li_2FeSiO_4$ and $Li_2MnSiO_4$.

Cathode active materials other than the one represented by the general formula $Li_xM_yO_z$ include, for example, lithium titivates (such as $Li_4Ti_5O_{12}$), lithium metal phosphates (such as $LiFePO_4$, $LiMnPO_4$, $LiCoPO_4$ and $LiNiPO_4$), transition metal oxides (such as $V_2O_5$ and $MoO_2$), $TiS_2$, LiCoN, Si, $SiO_2$, $Li_2SiO_3$, $Li_4SiO_4$, and lithium storage intermetallic compounds (such as $Mg_2Sn$, $Mg_2Ge$, $Mg_2Sb$ and $Cu_3Sb$).

The form of the cathode active material is not particularly limited. It may be a particulate form.

A coating layer containing a Li ion conducting oxide may be formed on the surface of the cathode active material. This is because a reaction between the cathode active material and the solid electrolyte can be suppressed.

As the Li ion conducting oxide, examples include, but are not limited to, $LiNbO_3$, $Li_4Ti_5O_{12}$ and $Li_3PO_4$.

The content of the cathode active material in the cathode layer is not particularly limited. For example, it may be in a range of from 10 mass % to 100 mass %.

As the solid electrolyte used in the cathode layer, examples include, but are not limited to, those exemplified below as the solid electrolyte used in the below-described solid electrolyte layer. The content ratio of the solid electrolyte in the cathode layer is not particularly limited.

As the electroconductive material, a known electroconductive material may be used. As the electroconductive material, examples include, but are not limited to, a carbonaceous material and metal particles. For example, the carbonaceous material may be at least one selected from the group consisting of carbon nanotube, carbon nanofiber and carbon black such as acetylene black or furnace black. Of them, from the viewpoint of electron conductivity, the electroconductive material may be at least one selected from the group consisting of carbon nanotube and carbon nanofiber. The carbon nanotube and the carbon nanofiber may be vapor-grown carbon fiber (VGCF). As the metal particles, examples include, but are not limited to, particles of Al, particles of Ni, particles of Cu, particles of Fe and particles of SUS.

The content of the electroconductive material in the cathode layer is not particularly limited.

As the binder, examples include, but are not limited to, rubber-based binders such as butadiene rubber, hydrogenated butadiene rubber, styrene-butadiene rubber (SBR), hydrogenated styrene-butadiene rubber, nitrile-butadiene rubber, hydrogenated nitrile-butadiene rubber and ethylene-propylene rubber; fluoride-based binders such as polyvinylidene fluoride (PVdF), polyvinylidene fluoride-polyhexafluoropropylene copolymer (PVDF-HFP), polytetrafluoroethylene and fluorine rubber; polyolefin-based thermoplastic resins such as polyethylene, polypropylene and polystyrene; imide-based resins such as polyimide and polyamideimide; amide-based resins such as polyamide; acrylic resins such as polymethyl acrylate and polyethyl acrylate; and methacrylic resins such as polymethyl methacrylate and polyethyl methacrylate. The content of the binder in the cathode layer is not particularly limited.

The cathode layer can be formed as follows, for example. A cathode layer slurry is produced by putting the cathode active material and, as needed, the electroconductive material, the binder, etc., in a solvent and mixing them. The cathode layer slurry is applied on one surface of a support, and the applied cathode layer slurry is dried. Then, the end part of the cathode layer is shaved by use of laser or the like to form the thin film part and the space part at the end part, thereby forming the cathode layer.

As the solvent, examples include, but are not limited to, butyl acetate, butyl butyrate, heptane and N-methyl-2-pyrrolidone.

The method for applying the cathode layer slurry on one surface of the support is not particularly limited. As the method, examples include, but are not limited to, a doctor blade method, a metal mask printing method, an electrostatic coating method, a dip coating method, a spray coating method, a roller coating method, a gravure coating method and a screen printing method.

The cathode layer may be formed by another method. For example, a powdered cathode mix that contains the cathode active material and, as needed, other components, is subjected to pressure-forming. Then, the end part of the cathode layer is shaved by use of laser or the like to form the thin film part and the space part at the end part, thereby forming the cathode layer.

Anode Layer

The anode layer contains an anode active material. As optional components, the anode layer may contain a solid electrolyte, an electroconductive material, a binder, etc.

As the anode active material, a conventionally-known material may be used. As the conventionally-known material, examples include, but are not limited to, elemental Li, a lithium alloy, carbon, elemental Si, a Si alloy and $Li_4Ti_5O_{12}$ (LTO).

As the lithium alloy, examples include, but are not limited to, LiSn, LiSi, LiAl, LiGe, LiSb, LiP and LiIn.

As the Si alloy, examples include, but are not limited to, alloys with metals such as Li. Also, the Si alloy may be an alloy with at least one kind of metal selected from the group consisting of Sn, Ge and Al.

The form of the anode active material is not particularly limited. For example, the anode active material may be in a particulate form or a thin film form.

When the anode active material is in a particulate form, the average particle diameter ($D_{50}$) of the anode active material particles may be 1 nm or more and 100 μm or less, or it may be 10 nm or more and 30 μm or less, for example.

As the electroconductive material, binder and solid electrolyte contained in the anode layer, examples include, but are not limited to, those exemplified above as the electroconductive material, binder and solid electrolyte contained in the above-described cathode layer.

The method for forming the anode layer is not particularly limited. As the method, examples include, but are not limited to, pressure-forming a powdered anode mix that contains the anode active material and, as needed, other components such as an electroconductive material and a binder. Another example of the method for producing the anode layer is as follows: an anode layer slurry containing the anode active material, a solvent and, as needed, other components such as an electroconductive material and a binder, is prepared; the anode layer slurry is applied on one surface of a support; and the applied anode layer slurry is dried, thereby forming the anode layer. As the solvent used in the anode layer slurry, examples include, but are not limited to, those exemplified above as the solvent used in the cathode layer slurry. As the method for applying the anode layer slurry to one surface of the support, examples include, but are not limited to, those exemplified above as the method for applying the cathode layer slurry.

Solid Electrolyte Layer

The solid electrolyte layer contains at least a solid electrolyte.

As the solid electrolyte, examples include, but are not limited to, a sulfide-based solid electrolyte and an oxide-based solid electrolyte.

As the sulfide-based solid electrolyte, examples include, but are not limited to, $Li_2S$—$P_2S_5$, $Li_2S$—$SiS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX—$Li_3PO_4$—$P_2S_5$ and $Li_3PS_4$. The "$Li_2S$—$P_2S_5$" means a material composed of a raw material composition containing $Li_2S$ and $P_2S_5$, and the same applies to other solid electrolytes. Also, "X" in the "LiX" means a halogen element. The LiX contained in the raw material composition may be one or more kinds. When two or more kinds of LiX are contained in the raw material composition, the mixing ratio is not particularly limited.

For example, the sulfide-based solid electrolyte may be a sulfide-based solid electrolyte produced by mixing $Li_2S$ and $P_2S_5$ to ensure that the mass ratio between $Li_2S$ and $P_2S_5$ ($Li_2S/P_2S_5$) is 0.5 or more. From the viewpoint of excellent ion conductivity, the sulfide-based solid electrolyte may be a sulfide-based solid electrolyte obtained by mixing $Li_2S$ and $P_2S_5$ to ensure that the mass ratio of $Li_2S$ to $P_2S_5$ is 70:30.

The molar ratio of the elements in the sulfide-based solid electrolyte can be controlled by controlling the contents of the elements contained in raw materials. The molar ratio and composition of the elements in the sulfide-based solid electrolyte can be measured by inductively coupled plasma atomic emission spectroscopy, for example.

The sulfide-based solid electrolyte may be glass, crystal or crystalline glass ceramic.

The crystal state of the sulfide-based solid electrolyte can be confirmed by X-ray powder diffraction measurement using CuKα radiation, for example.

The glass can be obtained by amorphizing a raw material composition (such as a mixture of $Li_2S$ and $P_2S_5$). The raw material composition can be amorphized by mechanical milling, for example. The mechanical milling may be dry mechanical milling or wet mechanical milling. The mechanical milling may be the latter because attachment of the raw material composition to the inner surface of a container, etc., can be prevented.

The mechanical milling is not particularly limited, as long as it is a method for mixing the raw material composition by applying mechanical energy thereto. The mechanical milling may be carried out by, for example, a ball mill, a vibrating mill, a turbo mill, mechanofusion, or a disk mill. The mechanical milling may be carried out by a ball mill, or it may be carried out by a planetary ball mill. This is because the desired glass can be efficiently obtained.

The glass ceramic can be obtained by heating glass, for example.

The crystal can be obtained by heating glass or developing a solid state reaction of the raw material composition, for example.

For the heating, the heating temperature may be a temperature higher than the crystallization temperature (Tc) of the glass, which is a temperature observed by thermal analysis measurement. In general, it is 195° C. or more. On the other hand, the upper limit of the heating temperature is not particularly limited.

The crystallization temperature (Tc) of the glass can be measured by differential thermal analysis (DTA).

The heating time is not particularly limited, as long as the desired crystallinity is obtained. For example, it is in a range of from one minute to 24 hours, or it may be in a range of from one minute to 10 hours.

The heating method is not particularly limited. For example, a firing furnace may be used.

As the oxide-based solid electrolyte, examples include, but are not limited to, $Li_{6.25}La_3Zr_2Al_{0.25}O_{12}$, $Li_3PO_4$, and $Li_{3+x}PO_{4-x}N_x$ (LiPON).

From the viewpoint of handling, the form of the solid electrolyte may be a particulate form.

The average particle diameter ($D_{50}$) of the solid electrolyte particles is not particularly limited. The lower limit may be 0.5 μm or more, and the upper limit may be 2 μm or less.

As the solid electrolyte, one or more kinds of solid electrolytes may be used. In the case of using two or more kinds of solid electrolytes, they may be mixed together.

In the disclosed embodiments, unless otherwise noted, the average particle diameter of particles is a volume-based median diameter ($D_{50}$) measured by laser diffraction/scattering particle size distribution measurement. Also in the disclosed embodiments, the median diameter ($D_{50}$) of particles is a diameter at which, when particles are arranged in ascending order of their particle diameter, the accumulated volume of the particles is half (50%) the total volume of the particles (volume average diameter).

The content of the solid electrolyte in the solid electrolyte layer is not particularly limited.

From the viewpoint of exerting plasticity, etc., a binder for binding the solid electrolyte particles can be incorporated in the solid electrolyte layer. As the binder, examples include, but are not limited to, a binder that can be incorporated in the above-described cathode layer. However, the content of the binder in the solid electrolyte layer may be 5.0 mass % or less, from the viewpoint of preventing excessive aggregation of the solid electrolyte particles, enabling the formation of the solid electrolyte layer in which the solid electrolyte particles are uniformly dispersed, etc., for the purpose of easily achieving high battery power output.

The thickness of the solid electrolyte layer is not particularly limited and is appropriately controlled depending on the battery structure. It is generally 0.1 μm or more and 1 mm or less.

The solid electrolyte layer may be formed by pressure-forming a powdered material for forming the solid electrolyte layer, the material containing the solid electrolyte and, as needed, other components, for example.

Laminate Production Method

The laminate production method of the disclosed embodiments is not particularly limited, as long as it is a method by which the above-described laminate of the disclosed embodiments is obtained.

The laminate production method of the disclosed embodiments comprises, for example, (1) a stacking step, (2) a pressing step and (3) a thinning step. As needed, the method may include (4) a filling step and (5) an attaching step.

(1) Stacking Step

The stacking step is a step of obtaining an assembly of the cathode layer, the solid electrolyte layer and the anode layer, which are stacked in this order.

The method for stacking the cathode layer, the solid electrolyte layer and the anode layer is not particularly limited. For example, the cathode layer, the solid electrolyte layer and the anode layer may be stacked in this order by forming the anode layer on a support, forming the solid electrolyte layer thereon, and then forming the cathode layer thereon.

Another method for stacking the cathode layer, the solid electrolyte layer and the anode layer may be as follows: first, the cathode layer, the solid electrolyte layer and the anode layer are separately formed; next, the cathode layer is transferred on one surface of the solid electrolyte layer; and the anode layer is transferred on the other surface of the solid electrolyte layer, thereby stacking the cathode layer, the solid electrolyte layer and the anode layer in this order. At the time of transferring the layers, pressure is applied. The pressure is not particularly limited, and it may be about 100 MPa.

At this stage, the cathode layer of the assembly is a cathode layer in which the thin film part and the space part are not yet formed at the end part.

(2) Pressing Step

The pressing step is a step of pressing the assembly at a given pressure in the laminating direction of the assembly.

The pressure applied to press the assembly may be more than 20 MPa and 600 MPa or less, for example.

The temperature of the pressing step is not particularly limited. It may be appropriately controlled to a temperature that is less than the deterioration temperatures of the materials contained in the assembly.

The method for pressing the assembly is not particularly limited. As the method, examples include, but are not limited to, pressing by use of a plate press machine, a roll press machine or the like.

(3) Thinning Step

The thinning step is a step of obtaining the laminate of the disclosed embodiments by forming the thin film part at the end part of the cathode layer of the assembly and forming the space part on the thin film part.

As described above, the method for forming the thin film part and the space part is not particularly limited. The thin film part and the space part may be formed by shaving the cathode layer by applying laser to the end part of the cathode layer to form the desired space.

(4) Filling Step

The filling step is a step of filling the space part of the end part of the cathode layer with at least one of the electroconductive material and the adhesive.

The space part may be filled with at least one of the electroconductive material and the adhesive, may be filled with both the electroconductive material and the adhesive, or may be filled with the adhesive containing the electroconductive substance.

The electroconductive material and the adhesive will not be described here, since they are as described above.

By filling the space part of the end part of the cathode layer with at least one of the electroconductive material and the adhesive, uneven surface pressure distribution in the all-solid-state battery comprising the laminate, is suppressed.

By filling the space part of the end part of the cathode layer with the electroconductive material, the electroconductivity of the end part in the all-solid-state battery comprising the laminate, is increased, whereby the resistance of the end part of the cathode layer is decreased.

By filling the space part of the end part of the cathode layer with the adhesive, the adhesion between the cathode current collector and the thin film part of the end part of the cathode layer in the all-solid-state battery comprising the laminate, is increased, whereby an increase in the resistance of the all-solid-state battery, which is due to the removal of the cathode current collector from the cathode layer, is suppressed.

Since the adhesive contains the electroconductive substance, the adhesion between the cathode current collector and the thin film part of the end part of the cathode layer in the all-solid-state battery comprising the laminate, is increased, and the electroconductivity of the end part in the all-solid-state battery comprising the laminate, is increased, whereby the resistance of the end part of the cathode layer is decreased.

The filling method is not particularly limited. For example, at least one of the electroconductive material, which is in a paste form, and the adhesive, which is in a paste form, is applied on the thin film part, thereby filling the space part therewith.

The applying method is not particularly limited. As the applying method, examples include, but are not limited to, those exemplified above as the method for applying the above-described cathode layer slurry.

(5) Attaching Step

As needed, the laminate of the disclosed embodiments may include the cathode current collector on the cathode layer side of the laminate and an anode current collector on the anode layer side of the laminate.

The attaching step is a step of obtaining a battery unit by attaching the cathode current collector to the cathode layer side of the laminate and attaching the anode current collector to the anode layer side of the laminate, by use of an adhesive.

The attaching step may be carried out after (3) the thinning step, from the viewpoint of easy formation of the thin film part of the end part of the cathode layer. The attaching step may be carried out before (4) the filling step.

The laminate obtained through (3) the thinning step, (4) the filling step and (5) the attaching step functions as the below-described all-solid-state battery.

A battery unit laminate may be formed by repeating the steps (1) to (5) to produce a plurality of the battery units, and attaching the battery units through the current collectors to stack them.

As the adhesive, the same one as the adhesive used to fill the space part of the end part of the cathode layer, is used.

When the adhesive is disposed on each current collector or on each active material layer, the adhesive may be disposed to ensure that at least a part of the stacked current collector and active material layer are attached.

Press pressure is applied to attach the current collectors and the active material layers. From the viewpoint of suppressing a crack in the active material layers, the press pressure may be smaller than the press pressure applied in (2) the pressing step, or it may be about 120 MPa.

In the attaching step, the temperature of the adhesive is not particularly limited. It may be less than the deterioration temperatures of the materials contained in the laminate, or it may be about 140° C.

Cathode Current Collector

The cathode current collector functions to collect current from the cathode layer. As the cathode current collector, a conventionally-known material that is usable as a cathode current collector in all-solid-state batteries, may be appropriately selected, and it is not particularly limited.

As the material for the cathode current collector, examples include, but are not limited to, metal materials such as SUS, Ni, Cr, Au, Pt, Al, Fe, Ti and Zn.

The form of the cathode current collector is not particularly limited. As the form, examples include, but are not limited to, various kinds of forms such as a foil form and a mesh form.

The cathode current collector may include a cathode lead to be connected with an external terminal.

Coat Layer

The cathode current collector may be such a metal foil that at least a part of the surface is coated with a coat layer containing an electroconductive material such as Ni, Cr or C (carbon). Due to the presence of the coat layer, the formation of a passivated coating film on the cathode current collector and the resulting increase in the internal resistance of the all-solid-state battery, are suppressed.

The coat layer contains as least the electroconductive material. As needed, it may further contain other components such as a binder. As the binder that may be contained in the coat layer, examples include, but are not limited to, those mentioned above as the binder that may be contained in the cathode layer. The coat layer may be a plating or deposition layer composed of the electroconductive material.

As the coat layer, examples include, but are not limited to, a carbon coat layer in which 15 mass % of carbon (C) is contained as the electroconductive material, in which 85 mass % of polyvinylidene fluoride (PVDF) is contained as the binder, and which has a volume resistivity of $5 \times 10^3$ Ωm.

The thickness of the coat layer is not particularly limited. From the viewpoint of suppressing an increase in the internal resistance of the all-solid-state battery, the thickness may be 1 μm or more and 50 μm or less, or it may be about 10 μm.

From the viewpoint of the ease of suppressing an increase in the internal resistance of the all-solid-state battery, the coat layer may be disposed in the region where, on the cathode current collector, the cathode current collector and cathode layer attached to each other are stacked.

Anode Current Collector

The anode current collector functions to collect current from the anode layer. As the anode current collector, a conventionally-known material that is usable as an anode current collector in all-solid-state batteries, may be appropriately selected, and it is not particularly limited.

As the material for the anode current collector, examples include, but are not limited to, metal materials such as SUS, Cu, Ni, Fe, Ti, Co and Zn.

The form of the anode current collector is not particularly limited. It may be the same form as the above-described cathode current collector.

The anode current collector may include an anode lead to be connected with an external terminal.

All-Solid-State Battery

The all-solid-state battery of the disclosed embodiments comprises the laminate of the disclosed embodiments.

More specifically, the all-solid-state battery of the disclosed embodiments comprises at least one battery unit comprising the cathode, the anode and the solid electrolyte layer, the cathode comprising the cathode layer and, as needed, the cathode current collector, the anode comprising the anode layer and, as needed, the anode current collector, and the solid electrolyte layer being disposed between the cathode layer and the anode layer.

The all-solid-state battery of the disclosed embodiments may be a laminate of a plurality of the battery units. In this case, the number of the battery units of the laminate is not particularly limited, and it may be from 2 to 50, for example.

Figure 3:
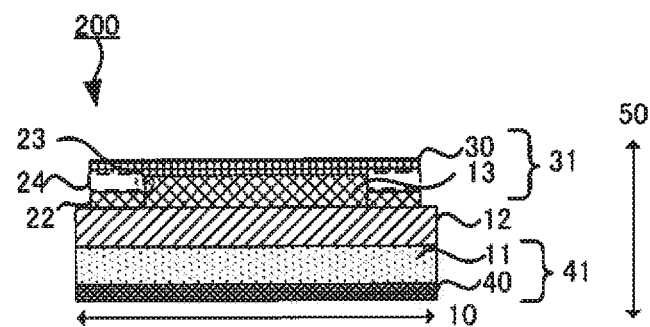
FIG. 3 is a schematic sectional view of an example of the all-solid-state battery of the disclosed embodiments.

FIG. 3 is a schematic sectional view of an example of the all-solid-state battery of the disclosed embodiments.

As shown in FIG. 3, an all-solid-state battery 200 comprises a cathode 31 comprising a cathode current collector 30 and a cathode layer 13, an anode 41 comprising an anode current collector 40 and an anode layer 11, and a solid electrolyte layer 12 disposed between the cathode layer 13 and the anode layer 11.

In the all-solid-state battery 200 of the disclosed embodiments, the area in the planar direction 10 of the cathode layer 13 is smaller than the area in the planar direction 10 of the anode layer 11.

The end part of the cathode layer 13 comprises, on the solid electrolyte layer 12, a thin film part 22 having a smaller thickness than the thickness of the central part of the cathode layer 13.

Also, the end part of the cathode layer 13 comprises, on the thin film part 22, a space part 24 formed by a level difference 23 between the thin film part 22 and the central part. In FIG. 3, the level difference 23 is indicated by a dotted line. Also in FIG. 3, the space part 24 is a region indicated by a dashed line.

Cathode

The cathode comprises the cathode layer and the cathode current collector.

The cathode layer and the cathode current collector will not be described here, since they are the same as those used in the above-described laminate of the disclosed embodiments.

Anode

The anode comprises the anode layer and the anode current collector.

The anode layer and the anode current collector will not be described here, since they are the same as those used in the above-described laminate of the disclosed embodiments.

As needed, the all-solid-state battery comprises an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in solid electrolytes. As the material, examples include, but are not limited to, resins such as polypropylene polyethylene and acrylic resin.

As the all-solid-state battery, examples include, but are not limited to, an all-solid-state lithium ion battery, an all-solid-state sodium battery, an all-solid-state magnesium battery and an all-solid-state calcium battery. The all-solidstate battery may be an all-solid-state lithium ion battery. Also, the all-solid-state battery may be a primary or secondary battery.

As the form of the all-solid-state battery, examples include, but are not limited to, a coin form, a laminate form, a cylindrical form and a square form.

Pressure is applied to the all-solid-state battery during the battery is in use. The pressure may be 1 MPa or more and 45 MPa or less, for example. Pressure is also applied to the all-solid-state battery during the battery is not in use. The pressure may be 0 MPa or more and 1 MPa or less, for example.

As the method for pressurizing the all-solid-state battery, examples include, but are not limited to, mechanical pressurization and gas pressurization.

As the mechanical pressurization, examples include, but are not limited to, pressurizing the all-solid-state battery in the laminating direction through a ball screw by driving a motor, and pressurizing the all-solid-state battery in the laminating direction through oil pressure by driving a motor. In the mechanical pressurization, the all-solid-state battery is pressurized or depressurized to a given pressure, and then the operating part of the machine is fixed by a mechanical stopper, whereby the energy consumption accompanied with the driving of the motor is minimized.

As the gas pressurization, examples include, but are not limited to, pressurizing the all-solid-state battery through pressurized gas supplied from an installed gas cylinder.

The all-solid-state battery of the disclosed embodiments is used as a battery source installed in a vehicle, a battery source for driving portable electronic devices, etc. However, the applications of all-solid-state battery of the disclosed embodiments are not limited to them.

Vehicles to which the all-solid-state battery of the disclosed embodiments is applicable, are not limited to electric vehicles which are equipped with a battery and which are not equipped with an engine. They also include hybrid electric vehicles equipped with both a battery and an engine.

10. Planar direction
11. Anode layer
12. Solid electrolyte layer
13. Cathode layer
20. End part
21. Central part
22. Thin film part
23. Level difference
24. Space part
30. Cathode current collector
31. Cathode
40. Anode current collector
41. Anode
50. Laminating direction
51. Crack
100. Laminate
200. All-solid-state battery
300. Conventional all-solid-state battery
A. End edge
B. Center point
L. Distance from the end edge to the center point

The invention claimed is:

1. A laminate comprising an anode layer, a solid electrolyte layer and a cathode layer in this order,
    wherein an area in a planar direction of the cathode layer is smaller than an area in a planar direction of the anode layer;
    wherein an end part of the cathode layer comprises, on the solid electrolyte layer, a thin film part having a smaller thickness than a thickness of a central part of the cathode layer;
    wherein the end part of the cathode layer comprises, on the thin film part, a space part formed by a level difference between the thin film part and the central part;
    where the thin film part of the cathode layer contacts the solid electrolyte layer, and the space part is formed between the thin film part and a cathode current collector
    wherein an electroconductive material is contained in the space part of the cathode layer; and
    wherein the end part of the cathode layer is an edge of the cathode layer in a planar direction of the laminate.

2. The laminate according to claim 1, wherein an adhesive is contained in the space part of the cathode layer.

3. The laminate according to claim 2, wherein the adhesive comprises an electroconductive substance which contains at least one kind of powder selected from the group consisting of carbon powder and aluminum powder.

4. The laminate according to claim 1, wherein the electroconductive material and optionally an adhesive substantially fills the space part.

* * * * *